United States Patent Office 2,984,630
Patented May 16, 1961

2,984,630

METHOD FOR PREPARING AN ALUMINA CATALYST BASE

David G. Braithwaite, Chicago, Ill., assignor to Nalco Chemical Company, a corporation of Illinois No Drawing. Filed Feb. 10, 1958, Ser. No. 714,053

7 Claims. (Cl. 252—464)

This invention relates to a method for preparing extruded alumina catalyst base suitable as a carrier for metal catalysts useful in the petroleum arts, especially for desulfurization of petroleum oils.

More particularly, this invention relates to a method for the preparation of an extruded alumina catalyst characterized by its low density, high activity, and in light of these two factors, enhanced crush resistance and attrition resistance when used as a base in a moving catalyst bed. It is well known in the art to provide extruded alumina catalyst bases by precipitation of boehmite, a form of aluminum hydrate in which the major proportion of the recovered precipitate is in the monohydrate form and of an amorphous nature. This invention is concerned with a novel method of formation of this particular chemical form of aluminum hydrate in a new physical state of subdivision and the particular method of treatment of the formed precipitate prior to impregnation with suitable catalytic metals for use in hydrogenation-desulfurization reactions primarily, as well as other catalytic treatment of petroleum hydrocarbons.

Heretofore, alumina catalyst bases formed from boehmite have been deficient in physical characteristics essential to satisfactory use as a base for impregation with metal catalysts because of their ready disintegration into smaller and smaller particles both during use as a catalyst carrier in hydrogenation-desulfurization reactions as well as during the regeneration cycles essential in certain catalytic petroleum processes.

The problem met by the present invention is to provide an alumina catalyst of high porosity, but yet of sufficient crush resistance and abrasion resistance to maintain its structure for extended periods of use in reactions wherein a moving bed of catalyst is subjected to a reaction cycle and a regeneration cycle. It is well known in such instances that the free space in a catalyst bed is an important factor in maintaining the efficiency of the reactor and the reaction. When the catalyst carrier deteriorates in particle size, the drop in pressure across the system increases because of the decreased free space in the reactor. The method of this invention provides a greatly improved catalyst carrier in that the alumina catalyst base resulting, while of increased relative volume and weight activity, meets by comparison the strength and attrition resistance of catalyst particles of considerably less relative volume and weight activity.

Further, it has been the general experience in the prior art that microspheres of alumina catalyst base have insufficient integrity to withstand the impregnation treatment with the usual metal catalyst activators and crumble excessively prior to extrusion. This defect interferes seriously with the later value of the catalyst carrier in oil processing. While the alumina catalysts formed by the process of this invention tend to disintegrate slightly during extrusion, such breakdown assists in forming extruded pellets of improved strength and of a high order of activity. Agglomeration of the microspheres during extrusion of the products of this invention is of such extent and quality to be indicative of an improved physical nature of a formed catalyst base particle as evidenced by superior performance in its intended end usage.

The general object of this invention is, therefore, the production of an aluminum hydrate catalyst consisting essentially of boehmite or the monohydrate in such physical state as to provide a catalyst carrier extrudate of high activity and low bulk density which will withstand water-washing following spray drying without appreciable particle breakdown, but which will during extrusion thereafter form a catalyst carrier of improved attrition resistance of a value at least about 75%.

More specifically, the object of this invention is to provide a method for the production of an aluminum monohydrate catalyst carrier of high activity and low bulk density but of improved strength, useful for longer periods in moving bed catalyst processes, without breakdown due to attritive forces.

The products of this invention are characterized by an apparent bulk density of less than 0.80 gram per cc. and after extrusion by an attrition value of at least 75% comprising essentially aluminum monohydrate as the catalyst carrier.

The products of this invention are made by reacting together a dilute aqueous solution of an alkali di-metal carbonate and a water soluble aluminate, first adjusting the pH to the acid side or less than 7 with an acidic water soluble aluminum salt, illustratively, aluminum sulfate, then re-adjusting the pH to the alkaline side, above 7.5 but not more than 9.5 with additional quantities of a water soluble aluminate, preferably sodium aluminate. The dilute aqueous alkaline solution is then heated to above 75° F. but not above about 150° F. to precipitate the monohydrate. Thereafter the precipitate which contains occluded and co-precipitated contaminants is recovered without washing and spray dried at 150 to about 325° F. under sufficient spray head pressure to form microspheres. After the microspheres have been formed, they are then water washed free from contaminants and unwanted impurity.

As it is well known that the physical form of alumina catalyst carriers or bases is markedly changed by conditions of precipitation and formation, best results will be obtained, it is believed, by following the method of formation of the alumina catalyst as herein specifically described, although minor variations in component concentrations and conditions other than those specifically referred to and illustrated in the exemplary portion of this disclosure may be changed to provide equivalent chemical and physical conditions of processing. The following is a general description of the preferred method of manufacture of the alumina catalyst carrier bases of this invention. Subsequent to the general description, examples have been included illustrating in specific detail the best known method of practice of the invention.

In the preferred method of formation of the alumina catalyst carrier, the reaction is carried out in extremely dilute solution wherein dilution of the reactants with water is carried on continuously during formation of the aluminum hydrate. An aqueous solution of soda ash of not appreciably more than about 1% concentration and preferably less is pumped into a first reaction tank. Into the soda ash solution a second aqueous solution of about 80% concentration of sodium aluminate is pumped in conjunction with dilution water into the first added alkaline solution while agitating the mixture. Subsequently, the commingled contents of the tank wherein the ratio of $Na_2CO_3$ to $Al_2O_3$ in the solution may be from 0.05 to 1 part $Na_2CO_3$ to 1 part $Al_2O_3$ but preferably is about 1:3 are heated to about 80° F., the pH of the solution adjusted to between 4.5 and about 5.5 by pumping into the tank a dilute aqueous solution of an aluminum salt of a strong acid, for example, aluminum sulfate. The aluminum sulfate solution has a concentration of about 8% $Al_2O_3$ and is pumped into the reaction mixture at a rate of about 15 to 18 gallons per minute. Thereafter the aqueous content of the reaction vessel is adjusted to a pH of about 8.5 with an additional quantity of dilute aqueous sodium aluminate solution, meanwhile continuing to dilute the reaction components in said first tank by continuously pumping water into the reaction vessel at a rate of from 15 to 35 gallons per minute. The contents of the first reaction tank, having not more than about 3% solids content, are then heated to about 120° F. and thereafter pumped to a secondary vessel. Precipitated aluminum hydrate is recovered from the secondary vessel by filtration. The crude product without further treatment, containing occluded and co-precipitated contaminants, is spray dried at about 300° F. powder temperature and a pressure sufficient to form microspheres, or of the order of about 900 lbs. per square inch. About 85%–90% of the so-formed microspheres of catalyst base are of such size as to pass through a 200 mesh sieve.

The spray dried product, as recovered, contains an appreciable quantity of sodium sulfate and other contaminants which, in the prior art practice, are reduced to not more than about 0.06% by weight of sodium as $Na_2O$, 1% by weight of sulfate, and 0.4% by weight of silica by extensive water-washing. Here, however, the precipitate is not washed but spray dried without washing and as spray dried contains in excess of about 1½% of $Na_2O$, about 20% solids, and in excess of 2% of $SO_4$.

Subsequent to the spray drying step, the recovered contaminant containing alumina catalyst base is washed with water to a level of less than 0.03% $Na_2O$ and less than 1.75% $SO_4$ at between 24 and 25% solids. The spray dried and washed product recovered at this point is of the order of 65%–70% by weight of the crude product obtained from the spray drying step.

After recovery, drying and purification of the base alumina catalyst, the base is further treated with active metal catalysts chosen in accordance with the ultimate end use of the catalyst material, extruded through ⅛ inch or 1/16 inch orifices or both in sequence. Base catalysts so prepared have been found to possess a relative activity by volume of 162 and by weight of 146. By direct comparison therewith products formed by first washing the recovered aluminum hydrate prior to spray drying have a comparative relative activity both by volume and by weight of 100.

(See "Chemical Process Principles," page 937, chapter 19, vol. 3 (1947), published by John Wiley and Sons, for details on relative activity.)

Samples of the catalyst produced by the method of this invention were subjected to a test in a device designed to simulate attrition obtained in actual use. This test, which is referred to as a test to determine "attrition value," is carried forward by weighing out 100 lbs. of the metal catalyst treated extruded catalyst particles in that final form passing through a 20 mesh sieve. The weighed, sized and graded test lot of catalyst particles is tumbled 2,400 times in a rotary mill, thereafter particles abraded from the test lot are removed and the larger particles retained, weighed. The percentage of particles retained of the original 100 lb. sample is herein referred to as the "attrition value." Attrition value is, in effect, the percentage of particles not abraded from the pellets subjected to the test. Tests of this nature performed on the ⅛ inch size extrudate catalyst subsequent to activating with metal and extrusion gave an attrition value of 86% and those particles of 1/16 inch diameter gave average values in excess of 98%. By direct comparison in similar tests a great improvement was obtained over aluminum hydrate catalysts produced in a similar fashion, but using sodium bicarbonate as the test alkali and washing the recovered aluminum hydrate filtrate free from contaminants prior to the spray drying step.

The advance over the prior art of this invention involves precipitation of an amorphous aluminum hydrate, essentially free of the trihydrate, by use of a water-soluble alkali metal carbonate, e.g., $Na_2CO_3$ or $K_2CO_3$, by the reaction therewith in extremely dilute solution of a water-soluble aluminate. The alkali metal carbonate must be a di-metal carbonate, i.e., containing two atoms of the alkali metal, as distinguished from the bicarbonate which contains only one atom of the alkali metal. The reaction is carried forward by first adjusting the pH of the reaction mixture to the acid side with an acidic water-soluble aluminum salt, e.g., aluminum sulfate or aluminum chloride. During adjustment of pH the reactants are continuously diluted by addition of water. Subsequent to the first pH adjustment, the system is again readjusted to a pH above 7.5 but less than 9.5 with additional quantities of an alkaline water-soluble aluminate solution (preferably sodium or potassium aluminate). The precipitation of aluminum hydrate or boehmite is brought about at a temperature between 75° F. and 150° F. and a solids concentration of less than about 3% in the aqueous reaction mixture at the time of precipitation of the aluminum hydrate. The ratio of carbonate as $Na_2CO_3$ is within the range of 0.05 to 1 part per part of $Al_2O_3$ in the aluminate solution. During a brief storage period the aluminum hydrate precipitates along with other co-precipitated and occluded contaminants and the crude aluminum hydrate recovered is spray dried. Carrying the occluded contaminant with the aluminum hydrate through the spray drying step materially influences the nature of the microspheres obtained following a later wash step. The spray dried particles are washed to remove occluded contaminants or impurities which materially affect the physical qualities of the spray dried, washed alumina catalyst base.

The advantages of spray drying the boehmite while containing contaminants may be in the effect of the contaminant in lowering the fusion temperature at points of tangency of the microspheres causing a slight sintering which provides wanted increase in strength without materially reducing specific surface or decreasing the density of the spray dried catalyst particles. While this theory is not established as factual, it may be of value in understanding the nature of the catalyst particle produced.

Following this method, catalysts of less bulk density, higher attrition value, and comparatively stronger crush resistance than possible by following the methods of the prior art, have been obtained. Each of the above steps outlined appears to contribute materially in providing the overall improvement obtained in the product by the process described.

The following examples have been included to illustrate the invention and to demonstrate its superiority in hydrogenation-desulfurization tests, results of which are hereinafter set out as illustrative. Unless otherwise stated the composition of the products are given on a dry weight basis.

EXAMPLE I

In a tank containing 6,000 gallons of water at 75° F. are dissolved 300 lbs. of soda ash. When the soda ash has been dissolved, 160 gallons of an 80% concentration aqueous sodium aluminate solution are pumped into the tank over a 15 to 20 minute time and the contents of the tank heated to 80° F. 400 gallons of aqueous aluminum sulfate of 7.8% $Al_2O_3$ concentration are added to the admixture over a one and one-half hour period with water of dilution in conjunction with and in addition thereto diluting the reaction mass at a rate of 18 gallons per minute.

The pH of the resulting aqueous reaction mass is adjusted to 8.5 with about 50 gallons of 82% concentration aqueous sodium aluminate solution which, while being added, is also diluted continuously with water at a rate of 35 gallons per minute over a five minute addition period.

The contents of the tank are heated to 120° F. and pumped to storage.

The precipitated hydrated alumina is thereafter filtered off in a large gel filter, but not washed. The filtered, slightly gelatinous, product is spray dried by concurrent drying at 150° F. to 305° F. (max.) powder temperature and at 900 lbs. per square inch pressure. 85% to 90% of the collected dried microspheres were of a size range to pass through a 200 mesh sieve.

The recovered, dried product was subjected to four plant wash cycles. The first reduced the $Na_2O$ content to 1.20 at 21.8% solids; the second in ammoniacal water of pH 9–10 reduced the impurities to between 0.13 and 0.28 $Na_2O$, and the $SO_4$ content 3.8% at 22% solids; the third wash product solids contained 0.040% $Na_2O$ and 1.50% $SO_4$ at 23.2% solids. The final recovered washed product averaged 0.026% $Na_2O$ and 1.62% $SO_4$ at 24.6% solids. The yield was 66% by weight of the recovered unwashed, spray dried product.

EXAMPLE II 4,900 parts by weight of the product of Example I was reslurried in water. 190 parts of finely divided $MoO_3$ were first pasted in a small amount of water and subsequently stirred into the catalyst base suspension. After about 20 minutes, 90 parts of finely divided pre-pasted $CoCO_3$ were also incorporated. The suspension was heated at 180° F. for 1½ hours. During the entire heating period samples were withdrawn at ten minute intervals and microscopically examined. None of the samples examined showed a breakdown of the microspheres of catalyst base. This is contrary to experience where the recovered precipitate of hydrated alumina catalyst base is washed prior to the spray drying step.

Samples of the impregnated stock were flash dried.

A typical analysis of the product obtained is as follows (on a dry basis):

Percent volatile _____ 2.9
Percent $Na_2O$ _____ 0.040
Percent $SO_4$ _____ 0.21
Percent $SiO_2$ _____ 0.20
Percent $MoO_3$ _____ 12.8
Percent CoO _____ 3.85
Percent MgO _____ 0.18
Percent CaO _____ 0.30
Percent Fe _____ 0.038

The physical qualities of the catalyst particles after extrusion through both ⅛ inch and 1/16 inch orifices and calcination were as follows:

|  | ⅛″ Stock | 1/16″ Stock |
|---|---|---|
| Relative Activity [1]: |  |  |
| Volume | 162 | 259 |
| Weight | 146 | 270 |
| Surface Area, M²/gram | 255 | 248 |
| Pore Volume, Cm.³/gram | 0.49 | 0.43 |
| Pore Diameter, A | 77 | 71 |
| Strength, lbs. crush | 10.5 | 15.7 |
| Attrition | 86.0 | 98.6 |
| ABD, gram/cc | 0.79 | 0.75 |

[1] A catalyst base of ⅛ inch extrudate size made by a similar reaction utilizing sodium bicarbonate and washing before spray drying had a relative activity by both volume and by weight of 100.

Mechanical crush strength is determined by the pounds pressure required to crush ⅛ inch length particles of the stated diameters. The force is applied across the diameter of the extruded particle.

The "attrition value" is determined by tumbling a weighed charge of activated or metal containing catalyst (freed from particles passing through a 20 mesh sieve) for 2,400 revolutions. The so-processed particulate product is re-sieved and the weight percentage of catalyst particles retained on the 20 mesh sieve is a measure of the capacity of the product to resist attrition.

EXAMPLE III

In a laboratory bench unit designed for hydrogen treating and desulfurizing, a heavy sour West Texas gas oil was subjected to treatment using 100 cc. of the catalyst prepared in accordance with the previous examples. The tests were conducted after charging the catalyst to the unit, the unit purged with nitrogen and heated to 700° F. in flowing hydrogen. After reaching temperature, a pressure of 450 lbs./sq. in. gauge was imposed over the unit. The gas oil was charged and processed overnight. In the morning the oil rate input was increased as noted and processing continued for two hours. At the end of this period samples were withdrawn for sulfur analysis. Three representative runs are tabulated below.

Table I

|  | Run I | | Run II | | Run III | |
|---|---|---|---|---|---|---|
| Hydrogen/HC, Std. cu. ft./barrel | 3,500 | | 3,500 | | 3,500 | |
| Pressure, p.s.i.g. | 450 | | 450 | | 450 | |
| Temperature, °F | 675 | | 700 | | 725 | |
|  | Overnight | A. M. | O/N | A. M. | O/N | A. M. |
| VHSV [1] | 2 | 4 | 2 | 4 | 2 | 4 |
| WHSV [2] | 2.4 | 4.8 | 2.4 | 4.8 | 2.4 | 4.8 |
| Sulfur, wt. percent | 0.45 | 0.75 | 0.30 | 0.60 | 0.15 | 0.46 |
| Gravity, °API | 26.8 | 26.2 | 27.0 | 26.5 | 27.3 | 26.8 |

[1] VHSV—Liquid volume, hourly space velocity.
[2] WHSV—Weight, hourly space velocity.

The feed stock had the following properties:

Gravity, °API _____ 24.1
Sulfur, wt. percent _____ 1.86
Nitrogen, wt. percent _____ 0.092
Nickel, p.p.m. _____ 0.23
Vanadium, p.p.m. _____ 0.59
Iron, p.p.m. _____ 0.3
Conradson-carbon, percent _____ 0.47

ASTM—Distillation, °F.:
I.B.P. _____ 439
10% _____ 652
20% _____ 713
30% _____ 752
50% _____ 817
70% _____ 895
90% _____ 991
E.P. _____ 1,085

The above tabulated data is superior to that obtained using a similarly prepared catalyst, except precipitated from sodium bicarbonate and washed to remove impurities prior to spray drying of the particles. The catalyst—as tested above—had superior crush strength and abrasion resistance than the described comparative product in similar test runs.

The invention is particularly well adapted to the manufacture of extrudible alumina compositions where the boehmite or monohydrate content must be kept to a maximum amount to obtain optimum catalytic activity. An illustration of such use of the method of this invention is Example III wherein the alumina product after metal activation was successfully formed into cylindrical pellets by extrusion, after which the pellets were employed as a support for a desulfurization catalyst (cobalt oxide and molybdenum oxide) and then used successfully in a desulfurization reaction.

When the alumina base of this invention is used as a support for a desulfurization catalyst, the purified base should preferably contain no more than 0.06% by weight of sodium, 1.0% by weight of sulfate, and 0.4% by weight of silica.

The alumina base or catalyst carrier of this invention can be used as a carrier for well known catalytic agents employed in catalytic cracking, dehydrogenation, hydrogenation, hydroforming, desulfurization, aromatization and reforming hydrocarbons. Among the catalytic agents which may be carried on alumina catalyst bases prepared as herein described are the oxides and other compounds of the related metals which have their differentiating electron in the second from the outermost shell (see W. F. Luder, Jour. of Chem. Ed. 16:394 (1939), for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium. The incorporation of these metals with the alumina base of the type herein described can be effected by a suitable treatment of the base with the sulfates, chlorides, nitrates, molybdenates, vanadates, chromates and other suitable salts by impregnation, precipitation, or according to suitable methods well known in the art. The alumina bases can also have incorporated therewith silica (e.g., 0.5% to 10% by weight of the alumina), zirconia, titania and/or thoria.

The alumina bases herein described are particularly suitable for use as carriers for the oxides or molecular combinations of chromium, molybdenum, cobalt and vanadium. As an illustration, a carrier consisting essentially of an alumina monohydrate of the type herein described can be used to support 1% to 12% of molybdenum oxide. Similar catalysts can be prepared containing as additional ingredients up to 10% titania and/or iron oxide.

The catalyst carriers of this invention have a bulk density of less than 0.80 gram per cc., but despite this high activity low density form have the surprising attrition value of in excess of 75% which provides the art with an excellent catalyst carrier when activated, as indicated above, for use in moving bed operations.

Having thus described my invention, I claim:

1. A method of preparing a porous alumina catalyst base characterized by an apparent bulk density of less than 0.80 gram per cc. which comprises reacting together an aqueous solution of an alkali di-metal carbonate and a water-soluble aluminate, adjusting the pH of said reaction mixture to less than 7 with an acidic water-soluble aluminum salt, thereafter adjusting the pH of said reactants to above 7.5 but less than 9.5 with additional quantities of said water-soluble aluminate, heating said dilute aqueous alkaline reaction mass to above 75° F. but not above about 150° F., recovering the aluminum hydrate precipitate including the occluded and co-precipitated contaminants, spray drying the crude precipitate at a temperature within the range of 150° F. to 325° F. under a spray head pressure sufficient to form microspheres and water washing the thus dried microspheres of aluminum hydrate until the contaminants have been substantially displaced from the so-prepared aluminum hydrate particles.

2. An improved alumina catalyst base prepared as set forth in claim 1.

3. A method of preparing a porous alumina catalyst base characterized by an apparent bulk density of less than 0.80 gram per cc. which comprises reacting together under continuous aqueous dilution aqueous solutions of an alkali di-metal carbonate and a water-soluble aluminate, adjusting the pH of said reaction mixture to less than 6 with an acidic water-soluble aluminum salt and, while continuing said aqueous dilution, re-adjusting the pH thereof to 8.0 to 8.5 with additional quantities of said water-soluble aluminate, heating the dilute aqueous alkaline reaction mass to above 75° F. but not above about 150° F., recovering the aluminum hydrate precipitate including the occluded and co-precipitated contaminants, spray drying the crude precipitate at a temperature of about 300° F. under a spray head pressure sufficient to form microspheres, water washing the thus dried microspheres of aluminum hydrate until the contaminants therein have been substantially displaced.

4. A method of preparing a porous alumina catalyst base characterized by an apparent bulk density of less than 0.80 gram per cc. which comprises reacting together under continuous aqueous dilution aqueous solutions of sodium carbonate and sodium aluminate, adjusting the pH of said reaction mixture to 4.5 to 5.5 with aluminum sulfate, and while continuing said aqueous dilution re-adjusting the pH of said aqueous reactants to a level of 8 but less than 9.5 with additional quantities of sodium aluminate solution, heating said dilute aqueous alkaline reaction mass to a temperature between 100° F. and 150° F., recovering the the aluminum hydrate precipitate including the occluded and co-precipitated contaminants, spray drying the crude precipitate at a temperature between 275° F. and 325° F. under a spray head pressure of about 900 lbs. per square inch to form microspheres and water washing the dried microspheres of contaminant-containing aluminum hydrate until said contaminants have been substantially displaced.

5. A method of preparing a porous alumina catalyst base characterized by an apparent bulk density of less than 0.80 gram per cc. which comprises reacting together under continuous aqueous dilution aqueous solutions of sodium carbonate and sodium aluminate, adjusting the pH of said reaction mixture to 4.5 to 5.5 with aluminum sulfate, and while continuing said aqueous dilution re-adjusting the pH of said aqueous reactants to a level of 8 but less than 9.5 with additional quantities of sodium aluminate solution, heating said dilute aqueous alkaline reaction mass to a temperature between 100° F. and 150° F., recovering the aluminum hydrate precipitate including the occluded and co-precipitated contaminants, spray drying the crude precipitate at a temperature between 275° F. and 325° F. under a spray head pressure of about 900 lbs. per square inch to form microspheres, water washing the dried microspheres of contaminant-containing aluminum hydrate until said contaminants have been substantially displaced, and extruding the recovered microspheres through a suitable die to recover a catalyst carrier characterized by an attrition value in excess of 75%.

6. A method of preparing a porous alumina base catalyst characterized by an apparent bulk density of less than 0.80 gram per cc. which comprises reacting together under continuous aqueous dilution aqueous solutions of sodium carbonate and sodium aluminate, adjusting the pH of said reaction mixture to 4.5 to 5.5 with aluminum sulfate, and while continuing said aqueous dilution re-adjusting the pH of said aqueous reactants to a level of 8 but less than 9.5 with additional quantities of sodium aluminate solution, heating said dilute aqueous alkaline reaction mass to a temperature between 100° F. and 150° F., recovering the aluminum hydrate precipitate including the occluded and co-precipitated contaminants, spray drying the crude precipitate at a temperature between 275° F. and 325° F. under a spray head pressure of about 900 lbs. per square inch to form microspheres and water washing the dried microspheres of contaminant-containing aluminum hydrate until said contaminants have been substantially displaced, incorporating into said microspheres an activating metal selected from the group consisting of vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium and extruding the recovered microspheres through a suitable die to recover an active catalyst characterized by an attrition value in excess of 75%.

7. An improved alumina catalyst prepared as set forth in claim 6.

References Cited in the file of this patent

UNITED STATES PATENTS

| | | |
|---|---|---|
| 2,096,769 | Tropsch | Oct. 26, 1937 |
| 2,325,033 | Byrns | July 27, 1943 |
| 2,371,237 | Heard | Mar. 13, 1945 |
| 2,446,799 | Winding | Aug. 10, 1948 |
| 2,713,037 | Kimberlin | July 12, 1955 |
| 2,813,837 | Holden | Nov. 19, 1957 |